United States Patent
Takeda et al.

(10) Patent No.: US 10,320,547 B2
(45) Date of Patent: Jun. 11, 2019

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/546,306

(22) PCT Filed: Jan. 29, 2016

(86) PCT No.: PCT/JP2016/052622
§ 371 (c)(1),
(2) Date: Jul. 26, 2017

(87) PCT Pub. No.: WO2016/121916
PCT Pub. Date: Aug. 4, 2016

(65) Prior Publication Data
US 2018/0019851 A1   Jan. 18, 2018

(30) Foreign Application Priority Data

Jan. 29, 2015 (JP) .................. 2015-014909

(51) Int. Cl.
*H04L 5/00* (2006.01)
*H04J 1/00* (2006.01)
(Continued)

(52) U.S. Cl.
CPC .............. *H04L 5/0053* (2013.01); *H04J 1/00* (2013.01); *H04J 11/00* (2013.01); *H04L 1/1671* (2013.01);
(Continued)

(58) Field of Classification Search
CPC ..... H04L 1/1671; H04L 5/001; H04L 5/0053; H04L 5/0055; H04W 16/14; H04W 16/32;
(Continued)

(56) References Cited

U.S. PATENT DOCUMENTS

| 2012/0008585 A1 | 1/2012 | Kwon et al. |
| 2012/0294272 A1 | 11/2012 | Han et al. |
| 2016/0226629 A1* | 8/2016 | Liu ....................... H04L 1/1861 |

FOREIGN PATENT DOCUMENTS

| WO | 2010/114252 A2 | 10/2010 |
| WO | 2010/114252 A3 | 1/2011 |

OTHER PUBLICATIONS

International Search Report issued in PCT/JP2016/052622 dated Apr. 19, 2016 (2 pages).
(Continued)

*Primary Examiner* — Mewale A Ambaye
(74) *Attorney, Agent, or Firm* — Osha Liang LLP

(57) ABSTRACT

The present invention is designed so that uplink control signals can be transmitted adequately even when the number of component carriers that can be configured in a user terminal is expanded. A user terminal can communicate by using six or more component carriers, and has a receive receiving section that receives a DL signal, a transmission section that transmits a UL control signal, which includes a delivery acknowledgement signal in response to the DL signal, and a control section that controls a format to apply to the UL control signal, and the control section applies a format, having large capacity in comparison to a PUCCH format of an existing system in which the number of component carriers to be configured is five or less, to the UL control signal.

18 Claims, 13 Drawing Sheets

(51) Int. Cl.
*H04J 11/00* (2006.01)
*H04W 16/14* (2009.01)
*H04W 16/32* (2009.01)
*H04W 72/04* (2009.01)
*H04L 1/16* (2006.01)
*H04J 13/00* (2011.01)

(52) U.S. Cl.
CPC ........... *H04W 16/14* (2013.01); *H04W 16/32* (2013.01); *H04W 72/04* (2013.01); *H04W 72/042* (2013.01); *H04W 72/044* (2013.01); *H04J 13/004* (2013.01); *H04J 2011/0009* (2013.01); *H04L 5/001* (2013.01); *H04L 5/0055* (2013.01)

(58) Field of Classification Search
CPC .. H04W 72/04; H04W 72/042; H04W 72/044
See application file for complete search history.

(56) References Cited

OTHER PUBLICATIONS

Written Opinion of the International Searching Authority issued in PCT/JP2016/052622 dated Apr. 19, 2016 (4 pages).

Nokia Corporation et al.; "New WI proposal: LTE Carrier Aggregation Enhancement Beyond 5 Carriers"; 3GPP TSG RAN Meeting #66, RP-142286; Maui, Hawaii (US); Dec. 8-11, 2014 (10 pages).
Catt; "Considerations on Remaining Issues of CSI Feedback"; 3GPP TSG RAN WG1 meeting #63bis, R1-110057; Dublin, Ireland; Jan. 17-21, 2011 (5 pages).
NTT Docomo, Inc.; "Motivation for New WI: UCI enhancements for LTE Carrier Aggregation"; 3GPP TSG-RAN #65, RP-141172; Edinburgh, Scotland; Sep. 9-12, 2014 (6 pages).
Nokia Siemens Networks et al.; "On PUCCH Resource allocation for CA"; 3GPP TSG RAN WG1 Meeting #60bis, R1-101885; Beijing, P.R. China; Apr. 12-16, 2010 (3 pages).
NTT Docomo, Inc.; "Necessary enhancements to enable LTE CA of up to 32CCs for DL and UL"; 3GPP TSG RAN WG1 Meeting #80, R1-150593; Athens, Greece; Feb. 9-13, 2015 (4 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Extended European Search Report issued in corresponding European Patent Application No. 16743519.7, dated Aug. 14, 2018 (10 pages).
LG Electronics, "Simultaneous transmission of CSI and ACK/NACK on PUCCH format 3", 3GPP TSG RAN WG1 #66 bis, R1-113267, Zhuhai, China, Oct. 10-14, 2011 (3 pages).

\* cited by examiner

|  | NUMBER OF USERS THAT CAN BE MULTIPLEXED | NUMBER OF BITS THAT CAN BE MULTIPLEXED |
|---|---|---|
| PUCCH format 1b | 36 | 2 |
| PUCCH format 3 | 5 | 10 |
| NEW LARGE-CAPACITY PUCCH | 1 | 64 |

FIG. 3

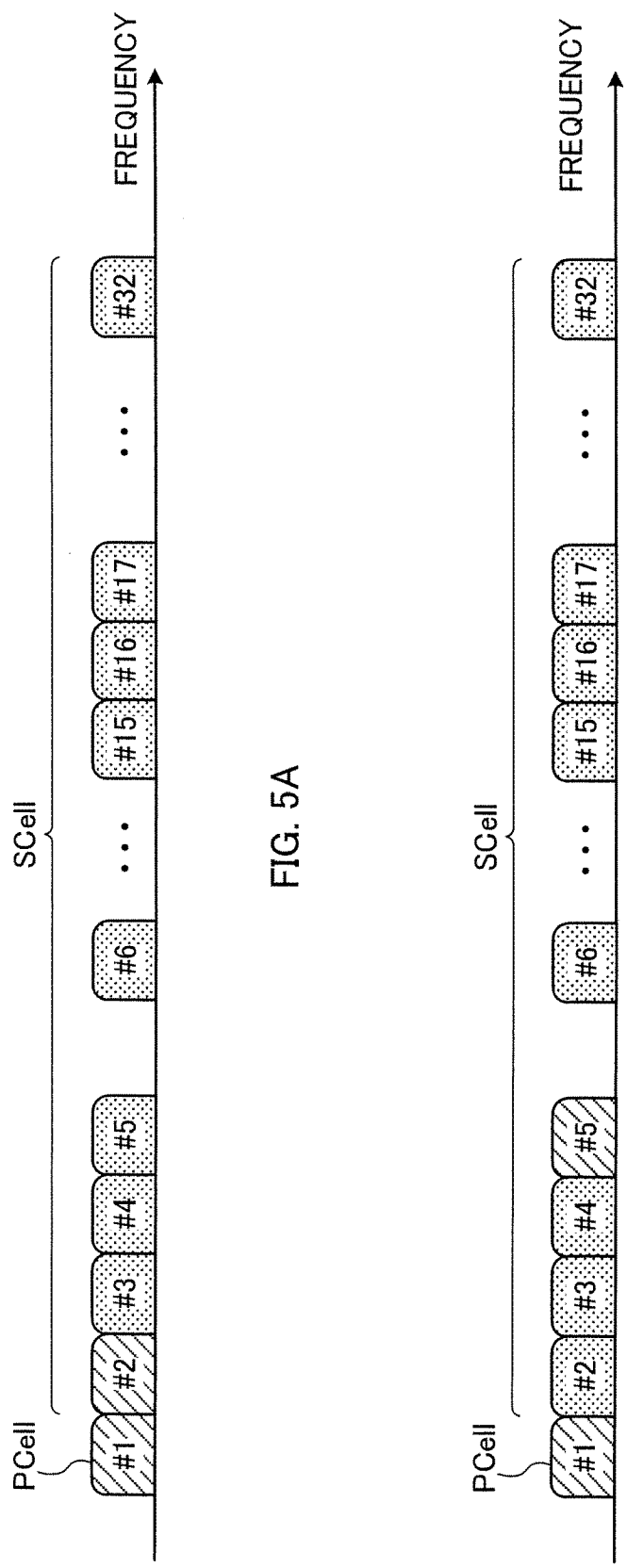

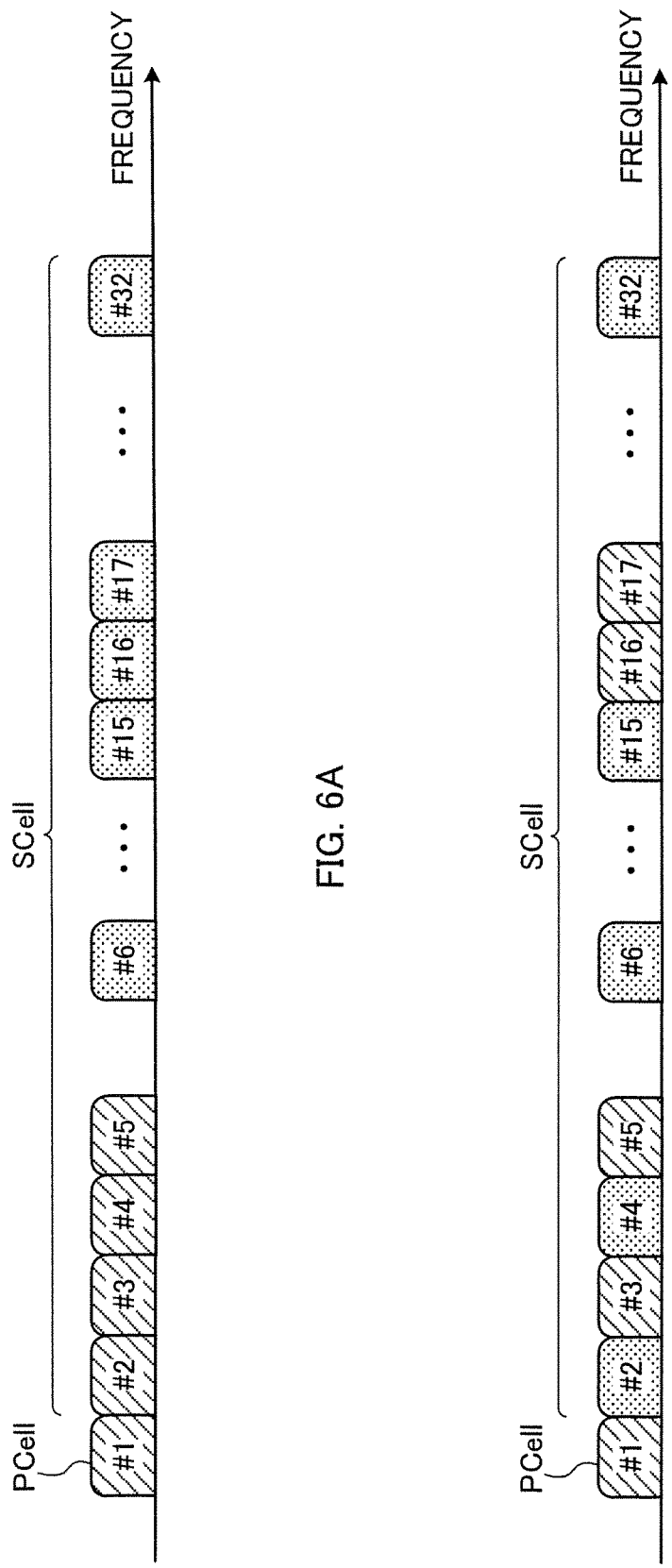

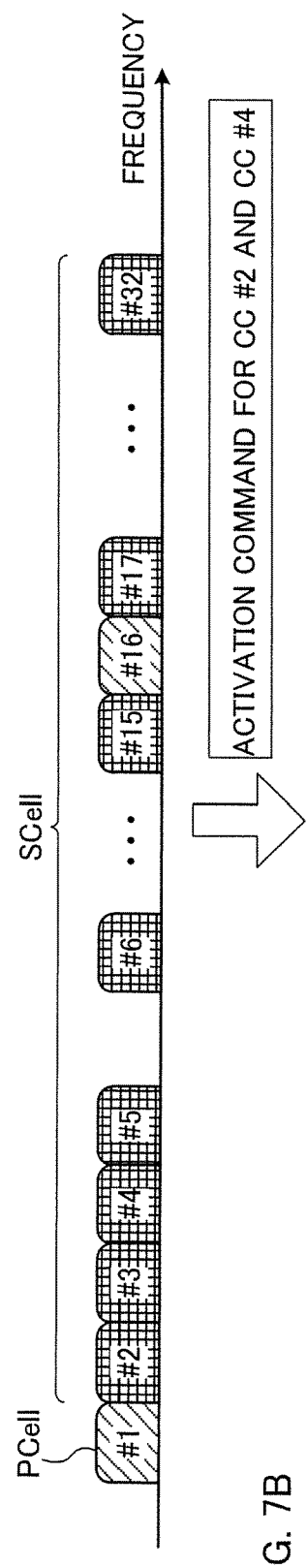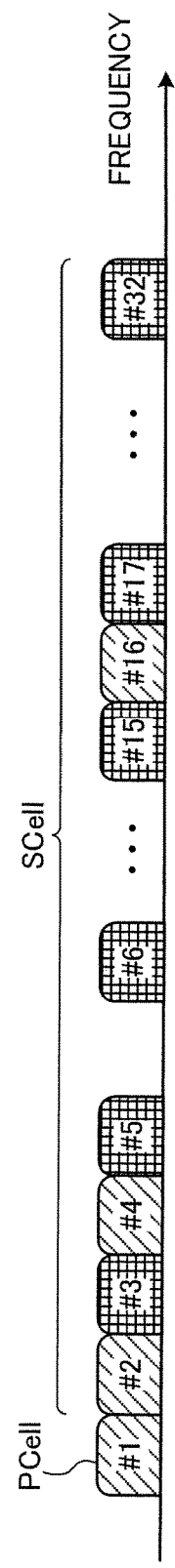

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Successor system of LTE—referred to as "LTE-advanced" (also referred to as "LTE-A")—have been under study for the purpose of achieving further broadbandization and increased speed beyond LTE, and the specifications thereof have been drafted as LTE Rel. 10 to 12.

The system band in LTE Rel. 10 to 12 includes at least one component carrier (CC), where the LTE system band constitutes one unit. Such bundling of a plurality of CCs into a wide band is referred to as "carrier aggregation" (CA).

In LTE of Rel. 8 to 12, the specifications have been drafted assuming exclusive operations in frequency bands that are licensed to operators—that is, licensed bands. For licensed bands, for example, 800 MHz, 2 GHz and/or 1.7 GHz have been in use.

In LTE of Rel. 13 and later versions, operation in frequency bands where license is not required—that is, unlicensed bands—is also a target of study. For unlicensed band, for example, 2.4 GHz, which is the same as in Wi-Fi, or the 5 GHz band and/or the like may be used. Although carrier aggregation (LAA: license-assisted access) between licensed bands and unlicensed bands is placed under study in Rel. 13 LTE, there is a possibility that, in the future, dual connectivity and unlicensed-band stand-alone will becomes targets of study as well.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In CA in the above-mentioned successor systems of LTE (LTE Rel. 10 to 12), the maximum number of CCs that can be configured per user terminal (UE) is limited to five. In and after LTE Rel. 13, which is an even more advanced successor system of LTE, a study is in progress to reduce the limit on the number of CCs that can be configured per UE and configure six or more CCs, in order to make possible even more flexible and faster wireless communication.

However, when the number of CCs that can be configured in a user terminal is expanded to six or more (for example, 32), it becomes difficult to use the transmission methods of existing systems (Rel. 10 to 12) on an as-is basis. For example, in existing systems, uplink control signals (UCI) such as delivery acknowledgment signals (HARQ-ACKs) for each CC's DL signals are transmitted on an uplink control channel (PUCCH Physical Uplink Control CHannel). In this case, the user terminal transmits uplink control signals by applying a PUCCH format that presupposes five or fewer CCs. On the other hand, when the user terminal transmits uplink control signals for six or more CCs, it is assumed that a new transmission method is required in order to properly transmit the uplink control signals.

The present invention has been made in view of the above, and it is therefore an object of the present invention to provide a user terminal, a radio base station and a radio communication method, whereby uplink control signals can be transmitted adequately even when the number of component carriers that can be configured in a user terminal is expanded.

Solution to Problem

According to one aspect of the present invention, a user terminal can communicate by using six or more component carriers, and has a receive receiving section that receives a DL signal, a control section that controls a format to apply to the UL control signal, and a transmission section that transmits a UL control signal, which includes a delivery acknowledgement signal in response to the DL signal, and the control section applies a format, having large capacity in comparison to a PUCCH format of an existing system in which the number of component carriers to be configured is five or less, to the UL control signal.

Advantageous Effects of Invention

According to the present invention, it is possible to transmit uplink control signals adequately even when the number of component carriers that can be configured in a user terminal is expanded.

BRIEF DESCRIPTION OF DRAWINGS

FIG. 3 is a diagram to show examples of existing PUCCH formats and a new format;

FIG. 5 provide diagrams to explain an example of the method of transmitting uplink control signals based on CCs where DL is allocated in enhanced CA;

FIG. 6 provide diagrams to explain another example of the method of transmitting uplink control signals based on CCs where DL is allocated in enhanced CA;

FIG. 7 provide diagrams to explain an example of the method of transmitting uplink control signals based on CCs in the active state;

DESCRIPTION OF EMBODIMENTS

Figure 1A:
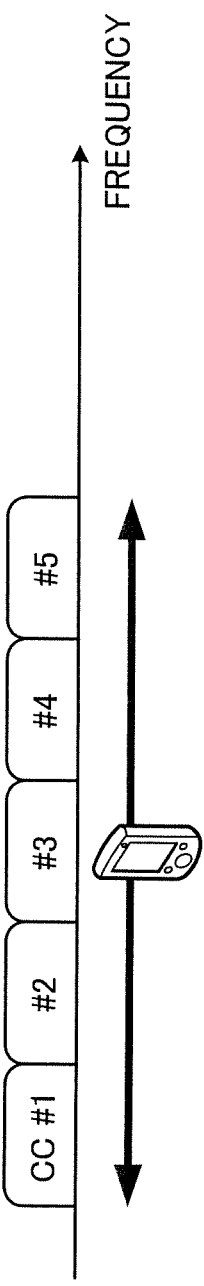
FIG. 1 provide diagrams to explain an overview of carrier aggregation in successor systems of LTE.
Figure 1B:
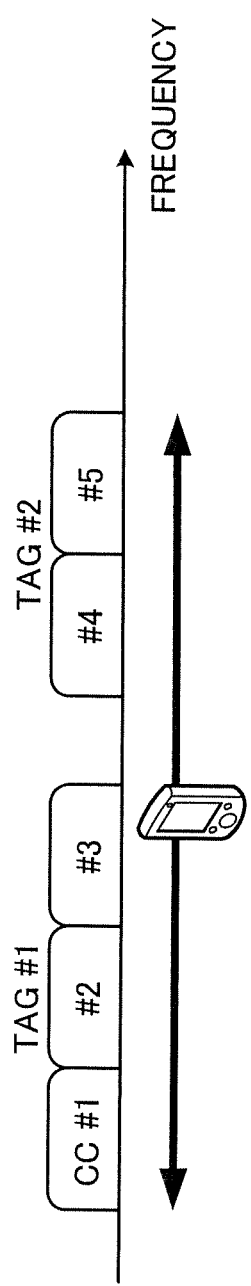
Figure 1C:
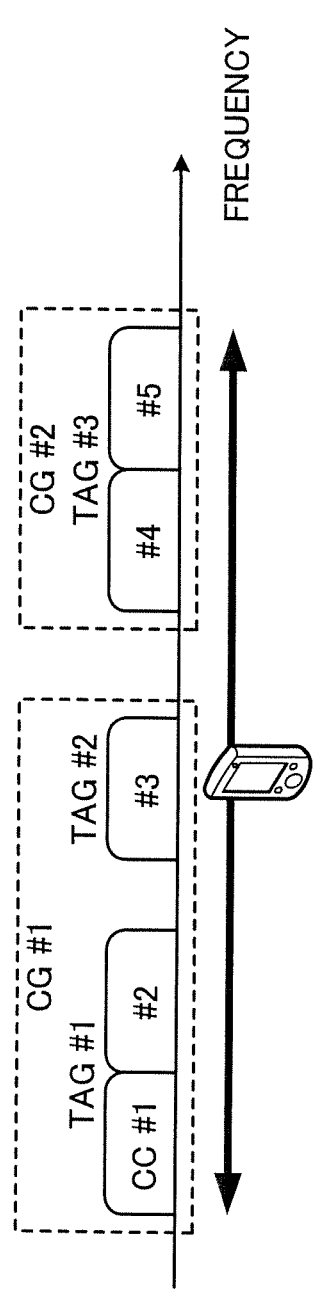

FIG. 1 provide diagrams to explain an overview of carrier aggregation in successor systems of LTE (LTE Rel. 10 to 12). FIG. 1A shows an overview of CA in LTE Rel. 10. FIG. 1B shows an overview of CA in LTE Rel. 11. FIG. 1C shows an overview of DC in LTE Rel. 12.

As shown in FIG. 1A, in CA in LTE Rel. 10, high speed data rates are made possible by providing a wide band by bundling maximum five component carrier (CCs) (CC #1 to CC #5), where the LTE system band constitutes one unit.

As shown in FIG. 1B, in CA in LTE Rel. 11, multiple timing advance (MTA), which enables varying timing control between CCs, is introduced. CA that employs MTA provides support for timing advance groups (TAGs), which are classified by the timing of transmission. Then, one radio base station's scheduler controls signal transmission timings on a per TAG basis. By this means, CA with a plurality of non-co-located CCs with small delay is realized, such as a radio base station and an RRH connected to the radio base station by ideal backhaul such as optical fiber.

In LTE Rel. 12, dual connectivity (DC), which bundles cell groups (CGs) formed by a plurality of radio base stations that are connected by non-ideal backhaul that produces delay that cannot be ignored, was introduced, and more flexible arrangement was realized (see FIG. 1C). In DC, it is assumed that scheduling is performed independently among the schedulers provided in a plurality of radio base stations.

By this means, CA by CCs belonging to separate cell groups formed by radio base stations that carry out independent scheduling is made possible. Also, DC supports multiple timing advance even in cell groups configured.

In CA in these successor systems of LTE (LTE Rel. 10 to 12), the maximum number of CCs that can be configured per user terminal is limited to five. Meanwhile, in more advanced successor systems of LTE, such as LTE Rel. 13 and later versions, a study is in progress to soften the limit on the number of CCs that can be configured per user terminal, and use enhanced carrier aggregation (CA enhancement), in which six or more CCs (cells) are configured.

Figure 2:
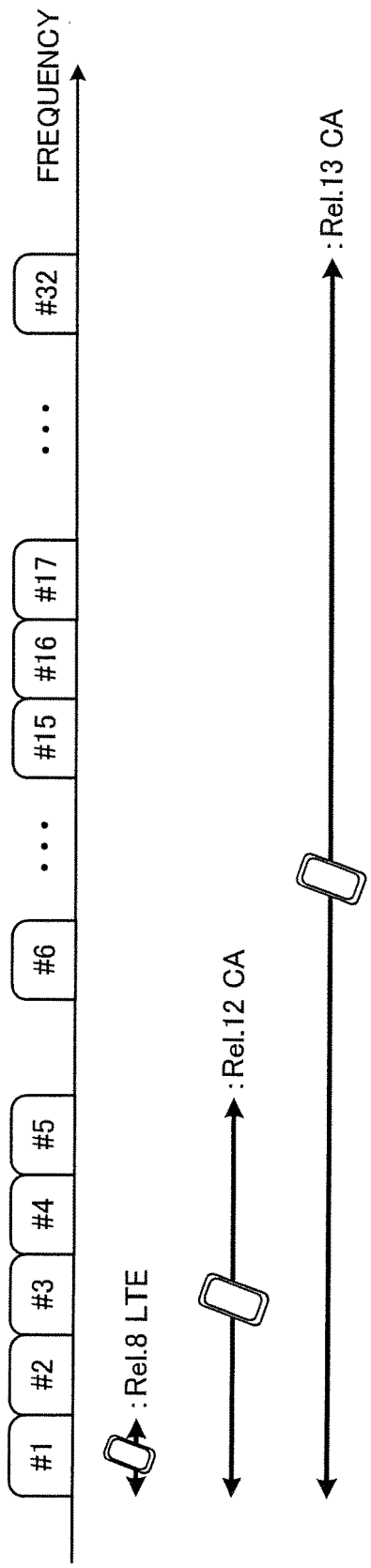
FIG. 2 is a diagram to explain component carriers in carrier aggregation being studied under LTE Rel. 13.

In enhanced CA, for example, as shown in FIG. 2, it is assumed that 32 component carriers are bundled together. In this case, it is possible to communicate using a bandwidth of maximum 640 MHz between the radio base station and the user terminal. By enhanced CA, more flexible and high speed wireless communication can be realized. Furthermore, there is an expectation to achieve high bandwidth by using a large number of CCs not only in licensed bands, which are bands in which specific operators are allowed exclusive use, but also in unlicensed bands, which are bands which are not limited to specific operators and in which radio base stations can be provided, and/or in high-frequency bands.

On the other hand, the present inventors have found that it is difficult to directly apply the transmission methods of existing systems (Rel. 10 to 12) when the number of CCs that can be configured in a user terminal is expanded to six or more (for example, 32).

For example, in existing systems (Rel. 10 to 12), uplink control signals such as delivery acknowledgment signals (HARQ-ACKs) for DL data (PDSCH) transmitted in each CC are transmitted in an uplink control channel (PUCCH). In this case, the user terminal transmits uplink control signals by applying a PUCCH format that presumes five or fewer CCs (for example, PUCCH format 1/1a, 1b, 3 or 1b with channel selection).

However, if the user terminal uses an existing PUCCH format on an as-is basis to transmit an uplink control signal of six or more CCs, there is a possibility that communication cannot be performed appropriately. Therefore, the present inventors have come up with the idea of introducing a new uplink control transmission method in order to transmit uplink control signals of six or more CCs (for example, 32 CCs) in Rel. 13 and later versions.

First, the present inventors have conceived, as an example of the present invention, to configure a new format that is capable of multiplexing uplink control signals (for example, HARQ-ACKs) corresponding to six or more CCs. Note that, although, in the following description, delivery acknowledgement signals (PDSCH) in response to DL signals will be described as exemplary uplink control signals, the present embodiment is by no means limited to this.

FIRST EXAMPLE

In the first mode, a new format that is capable of multiplexing uplink control signals (for example, HARQ-ACKs) of six or more CCs will be described.

First, existing PUCCH formats which a user terminal can use when transmitting delivery acknowledgment signals in existing systems (Rel. 10 to 12) will be described.

<Existing PUCCH Formats>

When CA is not applied in an FDD cell (non-CA), HARQ-ACKs (hereinafter also referred to as "A/Ns") that are fed back from each user terminal in one subframe are one or two bits. In this case, user terminals transmit one or two bits of A/Ns of by using BPSK or QPSK (BPSK or QPSK modulation) by applying PUCCH format 1a/1b.

When CA (two CCs) is applied using an FDD cell, maximum four bits are required to feed back A/Ns from each user terminal in one subframe. In this case, user terminals can transmit maximum four bits of A/Ns by applying PUCCH format 1b with channel selection (PUCCH format 1b with channel selection).

In PUCCH format 1b with channel selection (hereinafter also simply referred to as "channel selection"), maximum four bits of A/Ns are represented by using a plurality of PUCCH resource candidates and QPSK symbols. The user terminal selects and feeds back predetermined PUCCH resources/QPSK symbol points according to the content of each cell's A/N.

When CA of three or more CCs is applied in an FDD cell, A/Ns that are fed back from each user terminal in one subframe require a maximum 10 bits (in the event of five CCs). In this case, user terminals can transmit maximum 10 bits of A/Ns by applying PUCCH format 3.

Since, in TDD, A/Ns to correspond to a plurality of DL subframes separately are allocated to one UL subframe, even if CA is not employed (non-CA), more than two bits of A/Ns need to be fed back. Therefore, TDD supports A/N bundling, in which A/Ns of a plurality of DL subframes are seen as one A/N together. In TDD, even when CA is not applied, PUCCH format 1b with channel selection and PUCCH format 3 can be configured.

Also, in TDD, A/Ns of a plurality of DL subframes are transmitted in one UL in each CC. Therefore, when CA (two CCs) is applied in a TDD cell, cases occur where the A/Ns that multiplexed in one UL subframe exceed four bits. For example, when DL/UL configuration 2 is applied to CA (two CCs) in TDD, the A/Ns to be fed back in one UL is 16 bits at a maximum (four subframes×two CWs (codewords)×two CCs). As described above, in the TDD of existing systems, when the number of bits exceeds four bits, support is provided to apply A/N spatial bundling and make two CWs an A/N of one bit.

By applying A/N spatial bundling, the user terminal can feed back maximum eight bits (=16/2) of A/Ns in one UL subframe. Furthermore, in channel selection based on TDD PUCCH format 1b, maximum eight bits of A/Ns are converted into four bits, as in FDD, by using a code sequence. This can provide support for feedback of more A/N bits.

When CA of three or more CCs is applied in a TDD cell, the A/Ns that are fed back from user terminals in one subframe require maximum 20 bits (in the event of five CCs). For this reason, existing PUCCH format 3 in TDD cells provides support for A/N feedback of maximum 20 bits.

The new format of the present embodiment may be structured to have large capacity compared to the PUCCH formats of existing systems (Rel. 10 to 12) in which the number of CCs that can be configured is five or less.

For example, assume the case in which the number of CCs that can be configured in a user terminal is 32. In this case, considering that one CC supports HARQ-ACKs of two codewords (transport blocks), it is possible that the new format has a configuration in which the number of bits that can be multiplexed is 64 (the number of users that can be multiplexed is one) (see FIG. 3). Obviously, the configuration of the new format is not limited to the configuration shown in FIG. 3.

As shown in FIG. 3, the new format can greatly increase the number of bits that can be multiplexed (capacity) compared to existing PUCCH formats. A new format that is capable of multiplexing uplink control signals of six or more CCs can also be referred to as a "new PUCCH format," a "PUCCH format 4," an "enhanced PUCCH format," a "large-capacity PUCCH format," and so on.

As for the configuration of the new format, for example, a method of reducing the orthogonal block spreading codes in PUCCH format 3 may be possible. In existing PUCCH format 3, the same bit sequence is duplicated in five or four time symbols and multiplied by orthogonal spreading codes. The sequences are multiplied by user-specific orthogonal spreading codes, and are therefore orthogonally multiplexed. By setting the orthogonal code length to 1, for example, it is possible to place different information bit sequences on five or four time symbols. However, in this case, the number of users that can be multiplexed on the same PRB is reduced. For example, when the orthogonal code length is 1, although the bit sequence length that can be transmitted is five times or four times as long as existing PUCCH format 3, the number of users that can be multiplexed is one.

It is also possible to define a PUCCH format that uses frequency resources of two or more PRBs as a new format (large-capacity PUCCH format). For example, if a PUCCH format to be transmitted in two PRBs is provided based on the configuration of existing PUCCH format 3, twice the bit sequence of existing PUCCH format 3 can be transmitted. What number of PRBs are used and which PRBs are used for transmission may be determined by the UE according to the number of HARQ-ACK and/or CSI bits to be multiplexed on this PUCCH, may be specified in advance by higher layer signaling such as RRC signaling, or may be specified by the base station, on a per subframe basis, in a control signal such as the PDCCH.

Alternatively, it is possible to define a PUCCH format that uses M-ary modulation such as 16QAM or above, as a large-capacity PUCCH format. For example, if a PUCCH format to apply 16QAM modulation to UCI is provided based on the configuration of existing PUCCH format 3, twice the bit sequence of existing PUCCH format 3 can be transmitted. Which modulation scheme to use may be determined by the UE according to the number of HARQ-ACK and/or CSI bits to be multiplexed on this PUCCH, may be specified in advance by higher layer signaling such as RRC signaling, or may be specified by the base station, on a per subframe basis, in a control signal such as the PDCCH.

In the above description, "based on the configuration of existing PUCCH format 3" means re-using the coding method for UCI such as HARQ-ACKs or CSI, the mapping order to radio resources, the temporal symbol locations of reference signals included in PUCCH format 3 and so on. The reference signal sequences for generating reference signals may be different than the case of one PRB. For example, it is possible to use a reference signal sequence that is multiplexed on the PUSCH of two PRBs stipulated in existing LTE.

Alternatively, it is also possible to use the PUSCH as a new format that is capable of multiplexing uplink control signals of six or more CCs. In this case, even when the user terminal does not transmit the PUSCH, the user terminal transmits uplink control signals with the PUSCH.

Existing systems adopt a method in which, when UL data transmission and UCI transmission occur in the same subframe, the user terminal multiplexes UCI on the PUSCH where UL data transmission is commanded (piggyback). Unlike the PUCCH, the PUSCH is not configured to code-multiplex different users on the same PRB, and the number of information bits that can be included per PRB is large. Therefore, even if there is no UL data, if UCI is transmitted on the PUSCH, this can be seen as a large-capacity PUCCH format, and can transmit UCI.

The existing PUSCH is transmitted in a specific subframe/specific PRB based on the PDCCH/EPDCCH (UL grants stipulated as DCI format 0, DCI format 4, etc.) from the base station and higher layer signaling. This can be changed so that PUSCH transmission can be performed even when there is only HARQ-ACK or CSI transmission, for example.

The allocation of PRBs and the MCS for the PUSCH configuration for transmitting UCI may be, for example, designated in advance by higher layer signaling, or may be determined based on information about the PDCCH/EPDCCH (DL assignments stipulated as DCI format 1A, DCI format 2D, etc.) for commanding downlink data allocation, the PDSCH for transmitting downlink data, and so on. By doing so, it becomes unnecessary to transmit the PDCCH in order to specify the PRBs for transmitting the PUSCH-based large-capacity PUCCH format, so that the overhead of the control signal portion can be reduced.

Further, conventionally, when a PUSCH including UL data is transmitted, the user terminal receives the PHICH corresponding to the PUSCH, and determines whether or not to perform retransmission. On the other hand, HARQ is not applied to the PUCCH that transmits HARQ-ACKs or CSI.

Therefore, when transmitting a PUSCH that is used as a large-capacity PUCCH format (that is, when UL data is not included and UCI alone is included), the user terminal may not need to receive/detect the PHICH corresponding to the PUSCH. By doing so, the user terminal no longer has to perform unnecessary PHICH reception, so that the processing load on the user terminal can be reduced.

Alternatively, when transmitting a PUSCH used as a large-capacity PUCCH format (that is, when UL data is not included and UCI alone is included), the user terminal may receive and detect the PHICH corresponding to the PUSCH. The PUSCH that is not subject to code spreading requires higher received quality than the PUCCH (signal-to-interference-plus-noise ratio: SINR). By reporting the detection result of the PUSCH including UCI alone, by using the PHICH, and applying HARQ, the base station can receive control signals, reliably, with high quality.

<Control Method>

The user terminal reports to the radio base station (network) that the user terminal supports Rel. 13 carrier aggregation (Rel. 13 CA). In this case, the user terminal can report to the radio base station, as its capability information (capability), that the user terminal supports Rel. 13 CA. Note that Rel. 13 CA refers to, for example, CA using six or more CCs.

The radio base station configures Rel. 13 CA for the user terminal, and, furthermore, configures an uplink control information (UCI) transmission method stipulated in Rel. 13 and later versions. In the uplink control information (UCI) transmission method, for example, the radio base station configures the above-described new format (large-capacity PUCCH format) in the user terminal.

The user terminal, for which Rel. 13 CA is configured by higher layer signaling and so on adopts Rel. 13 CA, and, furthermore, controls the feedback of HARQ-ACKs and so on by using the UCI transmission method (new format) specified in Rel. 13 and later versions. The user terminal can be structured so that, as long as CA (the number of CCs configured, and so on) is not reconfigured by RRC signaling or the like, the user terminal can adopt the UCI transmission method defined in Rel. 13 and later versions (for example, a new format).

In this way, by allowing the user terminal to adopt a new format that supports uplink control signals of six or more CCs, the user terminal can transmit uplink control signals properly even when the number of CCs that can be configured in the user terminal is expanded to six or more CCs.

SECOND EXAMPLE

As shown in the first example, by using a new format that is capable of multiplexing uplink control signals of six or more CCs, the user terminal can transmit uplink control signals corresponding to six or more CCs in one UL transmission.

Meanwhile, the present inventors have focused attention on the fact that the number of CCs, to which the DL signals (DL transmission) for the user terminal where the new format (large-capacity PUCCH format) is configured can be allocated, may decrease depending on the situation of communication.

Figure 4:
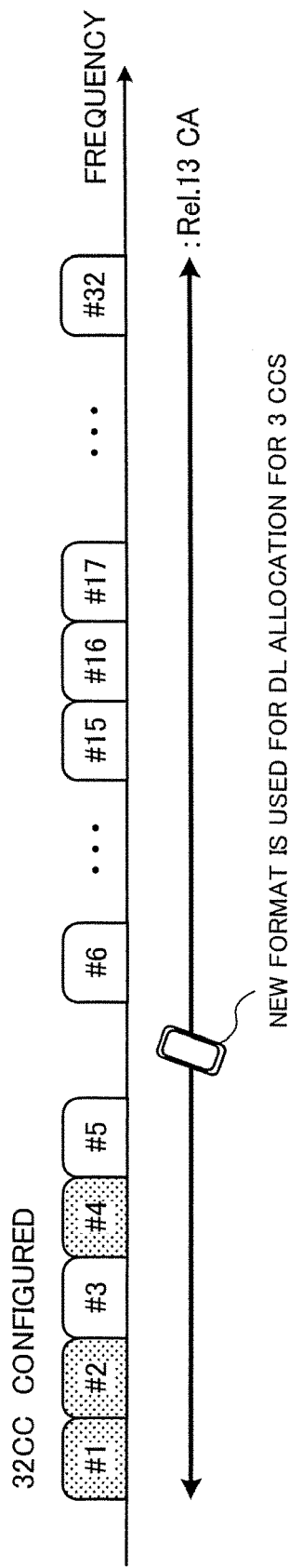
FIG. 4 is a diagram to show a case where DL is allocated to part of CCs in enhanced CA.

For example, assume the case where, in a given subframe, DL signal are transmitted only in three CCs, to a user terminal where multiple CCs (for example, 32 CCs) are configured (see FIG. 4). FIG. 4 shows the case where DL signals are transmitted in CC #1, #2 and #4 in a given subframe, and no DL signals are transmitted in the other CCs. In this case, the user terminal applies a new format having large capacity in order to feed back HARQ-ACKs in response to the three CCs of DL signals.

As described above, the present inventors have found out that, when the user terminal employs a new format, the user terminal uses the PUCCH with excessive overhead when the number of CCs to which DL signals (DL transmission) are allocated is small, and that the efficiency of the use of UL resources might therefore decrease.

Therefore, the present inventors have come up with the idea of exerting control to change the format to apply to UL control signals based on the number of CCs in which DL signals are transmitted (the number of CCs where DL is allocated). Now, the method of controlling the format to apply to UL control signals based on CCs in which DL signals are allocated will be described below.

The user terminal where Rel. 13 CA is configured controls the transmission of uplink control signals by switching between existing PUCCH formats (legacy UCI transmission method) and the new format (new UCI transmission method) based on CCs in which DL signals are transmitted. The user terminal can judge whether or not DL signals (DL transmission) are allocated to CCs based on the detection of downlink control channels (PDCCH and/or EPDCCH).

That is, when DL or DL signals are allocated only to predetermined CCs, the user terminal where Rel. 13 CA is configured adopts existing uplink control signal transmission (fallback to legacy UCI transmission). Hereinafter, the method of transmitting uplink control signals according to CCs where DL signals are allocated will be described.

<In the Event of Two CCs>

When DL signals allocated only in two predetermined CCs among a plurality of CCs in a given subframe, the user terminal can transmit HARQ-ACKs by using an existing PUCCH format (PUCCH format 1b with channel selection). The two predetermined CCs can be, for example, a primary cell (also referred to as "PCell") and a predetermined secondary cell (also referred to as "SCell"). The predetermined SCell can be, for example, the SCell having the smallest SCell index (SCell #0).

Alternatively, as the two predetermined CCs, the PCell and a specific SCell designated from a radio base station can be configured. The radio base station can configure a specific SCell in the user terminal by using higher layer signaling (for example, RRC signaling).

FIG. 5A shows a case where the PCell (here, CC #1) and the SCell (here, CC #2) having the smallest SCell index are configured as the two predetermined CCs. For example, if DL signals are allocated to CCs other than CC #1 and CC #2, the user terminal applies a UCI transmission method stipulated in Rel. 13 and later versions (for example, a new format), and transmits uplink control signals. On the other hand, when DL signals are allocated only to CC #1 and CC #2, the user terminal can apply existing PUCCH format 1b with channel selection, which has a higher spreading factor or which requires a lower SINR (that is, which has a lower possibility of error), and transmit uplink control signals. In the method shown in FIG. 5A, CCs where the possibility that data is scheduled is low are configured as CCs of low indices (for example CC #1 and CC #2) in advance, so that it is possible to reduce the frequency to transmit control signals and reduce the decrease of overhead.

FIG. 5B shows a case where the PCell (here, CC #1) and a specific SCell (here, CC #5) are configured as the two predetermined CCs by higher layer signaling. If DL signals are allocated to CCs other than CC #1 and CC #5, the user terminal applies a UCI transmission method stipulated in Rel. 13 and later versions (for example, a new format), and transmits uplink control signals. On the other hand, when DL signals are allocated only to CC #1 and CC #5, the user terminal can apply existing PUCCH format 1b with channel selection, which has a higher spreading factor or which requires a lower SINR (that is, which has a lower possibility of error), and transmit uplink control signals. The SCell index is used in various places such as cross-carrier scheduling control and MAC control. In the method of FIG. 5B, it is possible to realize more flexible control by separating SCell indices and these two predetermined CCs.

As shown in FIG. 5, by controlling the format to apply to uplink control signals based on the allocation of DL signals in predetermined CCs, it is possible to perform uplink transmission by applying an appropriate format depending on the situation of communication. By this means, even when the user terminal where a new format is configured transmits uplink control signals, it is still possible to suppress the reduction of the efficiency of the use of UL resources.

Further, as shown in FIG. 5, by configuring two predetermined CCs, when CCs other than the predetermined CCs are scheduled, control to execute the operation of Rel. 13 CA can be realized. The CCs other than the predetermined CCs may be, for example, unlicensed band CCs. That is, when license band CCs and unlicensed band CCs are co-present as CCs configured in the user terminal, existing PUCCH formats are applied to the license band CCs (for example, two CCs). On the other hand, the user terminal may be configured to apply a new format when an unlicensed band CC is added (when DL is allocated).

Regardless of the size of data (that is, whether the number of CCs to use is small or large), it is possible to unify control as to whether an existing PUCCH format or a new PUCCH format is used for the operation of users connected to the same base station. By eliminating or reducing the users that transmit in different PUCCH formats, it is possible to use uplink radio resources efficiently. Note that the two CCs need not be limited to predetermined cells, and it is equally possible to use a configuration in which the user terminal applies PUCCH format 1b with channel selection when DL signals are allocated only to two CCs among a plurality of CCs (or to the PCell and any one SCell).

Further, when uplink data (PUSCH) is transmitted in any one of the cells, the user terminal can feed back an uplink control signal using the PUSCH.

<In the Event of Five or Fewer CCs>

If DL signals are allocated to only five predetermined CCs among a plurality of CCs in a given subframe, the user terminal can transmit HARQ-ACKs by using an existing PUCCH format (PUCCH format 3). The five predetermined CCs can be, for example, the PCell and predetermined SCells. As the predetermined SCells, for example, it is possible to use SCells, up to four CCs, in ascending order of SCell indices. (SCells #0 to #4).

Alternatively, as the five predetermined CCs, it is possible to use the PCell and specific SCells, up to four CCs, that are specified by the radio base station. The radio base station can configure specific SCells in the user terminal by using higher layer signaling (for example, RRC signaling).

FIG. 6A shows a case the PCell (here, CC #1), and SCells (here, CCs #2 to #5), up to four CCs, in ascending order of SCell indices, are used as the five predetermined CCs. For example, if DL signals are allocated to CCs other than CC #1 and CCs #2 to #5, the user terminal applies a UCI transmission method stipulated in Rel. 13 and later versions (for example, a new format). On the other hand, if DL signals are allocated only to CC #1 or CCs #2 to #5, the user terminal can apply existing PUCCH format 3 that has a higher spreading factor or that requires a lower SINR (that is, that has a lower possibility of error). In the method shown in FIG. 6A, CCs where the possibility that data is scheduled is low are configured as CCs of low indices (for example CC #1 to CC #5) in advance, so that it is possible to reduce the frequency to transmit control signals and reduce the decrease of overhead.

FIG. 6B shows a case where the five predetermined CCs are the PCell (here, CC #1) and specific SCells (here, CCs #3, #5, #16 and #17) configured by higher layer signaling. If DL signals are allocated to CCs other than the PCell (CC #1) and the specific SCells, the user terminal applies a UCI transmission method stipulated in Rel. 13 and later versions (for example, a new format). On the other hand, if DL signals are allocated only to the PCell and the specific SCells, the user terminal can apply existing PUCCH format 3 that has a higher spreading factor or that requires a lower SINR (that is, that has a lower possibility of error). The SCell index is used in various places such as cross-carrier scheduling control and MAC control. In the method of FIG. 6B, it is possible to realize more flexible control by separating SCell indices and these five predetermined CCs.

Furthermore, if DL signals are allocated to two predetermined CCs, the user terminal may apply PUCCH format 1b with channel selection as shown in FIG. 5 above.

As shown in FIG. 6, by controlling the format to apply to uplink control signals based on the allocation of DL signals in predetermined CCs, it is possible to perform uplink transmission by applying an appropriate format depending on the situation of communication. By this means, even when the user terminal where a new format is configured transmits uplink control signals, it is still possible to suppress the reduction of the efficiency of the use of UL resources.

Further, as shown in FIG. 6, by configuring five predetermined CCs, when CCs other than the predetermined CCs are scheduled, control to execute the operation of Rel. 13 CA can be realized. The CCs other than the predetermined CCs may be, for example, unlicensed band CCs. That is, when license band CCs and unlicensed band CCs are co-present as CCs configured in the user terminal, existing PUCCH formats are applied to the license band CCs (for example, five CCs). On the other hand, the user terminal may be configured to apply a new format when an unlicensed band CC is added (when DL is allocated).

Regardless of the size of data (that is, whether the number of CCs to use is small or large), it is possible to unify control as to whether an existing PUCCH format or a new PUCCH format is used for the operation of users connected to the same base station. By eliminating or reducing the users that transmit in different PUCCH formats, it is possible to use uplink radio resources efficiently. Note that the five CCs need not be limited to predetermined cells, and it is equally possible to use a configuration in which the user terminal applies PUCCH format 3 when DL signals are allocated only to five CCs among a plurality of CCs (or to the PCell and any four or fewer SCells).

<In the Event of One CC>

If DL signals are allocated only to one predetermined CC among a plurality of CCs in a given subframe, the user terminal can transmit HARQ-ACKs by using an existing PUCCH format (PUCCH format 1b).

Thus, when the amount of uplink control signal data is small, the UL overhead can be reduced, dynamically, by applying a PUCCH format having small capacity compared to the new format (fallback).

<Control Method>

The user terminal reports to the radio base station (network) that the user terminal supports Rel. 13 carrier aggregation (for example, CA using six or more CCs). The radio base station configures CA in the user terminal by higher layer signaling (for example, RRC signaling and/or the like). Further, the radio base station reports information about the CCs to be in CA to the user terminal (information about the frequency, the number of CCs and so on).

Further, the radio base station reports information about UCI transmission methods that are applicable in Rel. 13 and later versions (for example, a new format), to the user terminal. Further, the radio base station can report information about the PUCCH resource to use when employing a PUCCH format of existing systems and/or the CC that transmits this PUCCH, to the user terminal. The PUCCH format of existing systems refers to PUCCH format 3 or PUCCH format 1b with channel selection.

Note that, if the user terminal selects the CC to transmit the PUCCH based on cell indices (for example, SCell indices), it is no longer necessary to send CC-specifying signaling from the radio base station.

The user terminal selects a predetermined format in accordance with CCs where DL data (PDSCH) is allocated, and controls the feedback of uplink control signals (for example, HARQ-ACKs).

For example, assume the case where the user terminal transmits uplink control signals by applying a new format, PUCCH format 3 or PUCCH format 1b depending on the number of CCs where DL signals are allocated. If DL signals are allocated to the PCell alone, the user terminal transmits uplink control signals by applying PUCCH format 1b. If DL signals are allocated to two to five CCs and allocated only to the PCell and specific CCs (SCells), the user terminal transmits uplink control signals by applying PUCCH format 3. If DL signals are allocated to six or more CCs or allocated to CCs other than the specific CCs (SCells), the user terminal transmits uplink control signals by applying a new format.

In addition, assume the case where the user terminal applies a new format, PUCCH format 1b with channel selection or PUCCH format 1b depending on the number of CCs where DL signals are allocated. If DL signals are allocated to the PCell alone, the user terminal transmits uplink control signals by applying PUCCH format 1b. If DL signals are allocated to two CCs and allocated to the PCell and a specific CC (SCell), the user terminal transmits uplink control signals by applying PUCCH format 1b with channel selection. If DL signals are allocated to six or more CCs or allocated to CCs other than the specific CC (SCell), the user terminal transmits uplink control signals by applying a new format.

Thus, the user terminal switches between applying existing PUCCH formats and applying a new format based on the CCs where DL is allocated, so that, even if the number of CCs is expanded to six or more, it is possible to transmit uplink control signals properly, and, furthermore, reduce the UL overhead adequately.

THIRD EXAMPLE

A case will be described with a third example where, the format to apply to uplink control signals is controlled based on the number of CCs in the active state (activated) among the CCs configured in the user terminal.

In the second example, to change the format to apply to uplink control signals depending on the CCs where DL signals are allocated. In this case, the user terminal judges whether or not DL signals are allocated to each CC based on the detection of a downlink control channel (PDCCH and/or EPDCCH). Meanwhile, cases occur where the user terminal fails to detect a downlink control channel.

For example, assume the case where DL signals allocated and transmitted in 32 CCs. In this case, the radio base station determines that the user terminal feeds back uplink control signals by applying a new format. However, when the user terminal fails to detect a downlink control channel in part of the CCs, the user terminal feeds back uplink control signals by applying an existing format. In this way, the communication status occurs also format recognition can differ of applying uplink control signals between the user terminal and the radio base station.

In this case, even if DL is allocated to six or more CCs, the radio base station has only to acquire HARQ-ACKs transmitted from the user terminal by performing the detection operation even for existing PUCCH formats, in addition to the new format. On the other hand, when the radio base station monitors for a new format and existing PUCCH formats, complex processing is required.

Accordingly, as another example (third example) of this embodiment, the present inventors have come up with the idea of controlling the format to apply to uplink control signals based on the number of CCs in the active state (activated). Hereinafter, the case where the user terminal controls the format to apply to uplink control signals based on the number of CCs configured in the active state.

<In the Event of Two CCs>

When the number of CCs in the active state is 2, the user terminal can apply existing PUCCH format 1b with channel selection (fallback) even if a new format is configured. Of the two CCs in the active state, one is the PCell and the other one can be any SCell.

Note that, assuming that a plurality of CCs are configured in the user terminal, a CC in the active state (activated) refers to a CC (cell) that is reported as being active, from the base station to the user terminal, by using a MAC control element (CE). A CC in the non-active state (de-activated) refers to a CC that is not in the active state among a plurality of CCs configured in the user terminal. The radio base station can configure CCs in each state (the active state or the non-active state) in the user terminal by using the MAC (Medium Access Control) layer.

FIG. 7A shows a case where the PCell (here, CC #1) and one non-specific SCell (here, CC #16) are configured as CCs in the active state (the other CCs are in the non-active state). In this case, the user terminal can apply existing PUCCH format 1b with channel section even if Rel. 13 CA (for example, a new format) is configured.

On the other hand, when CA is re-configured (reconfiguration) by higher layer signaling (for example, RRC signaling) or the like and two or more SCells (three or more CCs) are placed in the active state, the user terminal transmits uplink control signals by applying a new PUCCH format. For example, FIG. 7B shows the case where two more SCells (here, CC #2 and CC #4) are configured in the active state from the state of FIG. 7A. As shown in FIG. 7B, if the number of CCs in the active state becomes three or more (two or more SCells are in the active state), the user terminal can apply a new PUCCH format.

<In the Event of Two CCs to Five CCs>

If the number of CCs in the active state is two to five, the user terminal can apply an existing PUCCH format 3

(fallback) even if a new format is configured. Among the two to five CCs in the active state, one is the PCell, and the rest can be any SCells.

Figures 8A, 8B:
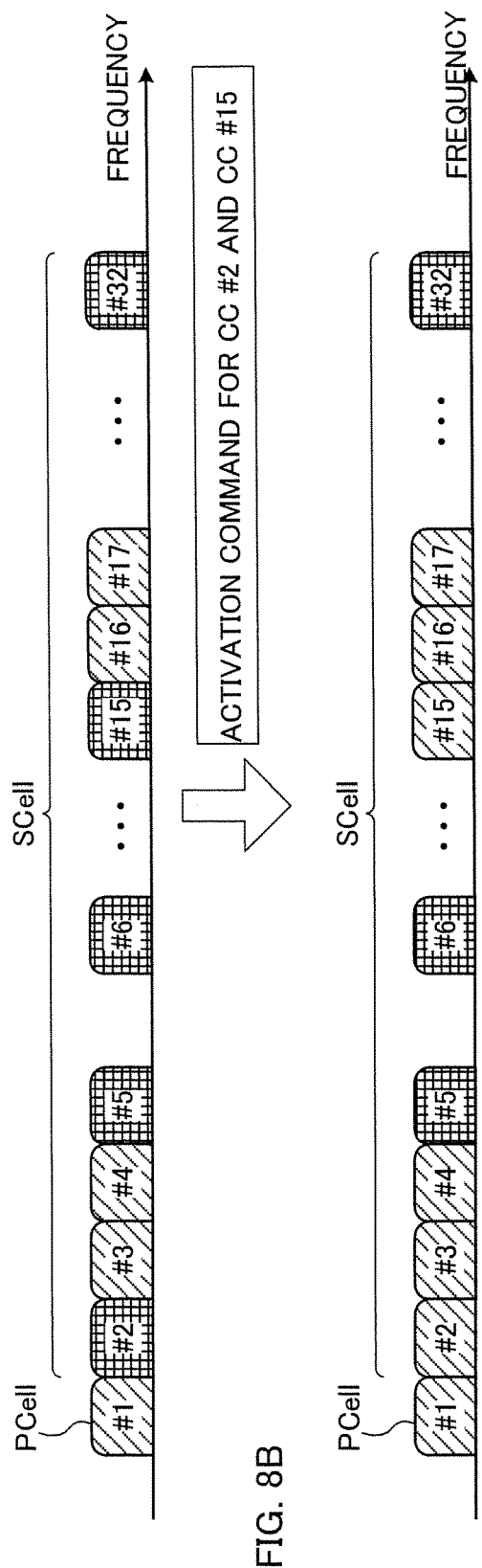
FIG. 8 provide diagrams to explain another example of the method of transmitting uplink control signals based on CCs in the active state.

FIG. 8A shows a case where the PCell (here, CC #1) and four unspecific SCells (here, CCs #3, #4, #16 and #17) are configured as CCs in the active state. In this case, even if Rel. 13 CA is configured, the user terminal apply existing PUCCH format 3 (for example, a new format).

On the other hand, when CA is re-configured by higher layer signaling (for example, RRC signaling) or the like and five or more SCells (six or more CCs) are placed in the active state, the user terminal transmits uplink control signals by applying a new PUCCH format. For example, FIG. 8B shows the case where two more SCells (here, CC #2 and CC #4) are configured in the active state from the state of FIG. 8A. If the number of CCs in the active state becomes six or more (five or more SCells are in the active state) as shown in FIG. 8B, the user terminal can apply the new PUCCH format that is already configured.

Thus, based on the number of CCs in the active state, a PUCCH format that has smaller capacity than a new format is applied (fallback) when the amount of uplink control signal data is small, so that it is possible to reduce the UL overhead. Also, the number of CCs in the active state can be judged by using MAC control, so that it is possible to reduce the possibility of differences in recognition between the radio base station and the user terminal. By this means, the radio base station has only to perform the detection operation for a specific PUCCH (PUCCH format resource) based on the CCs configured in the active state, so that it is possible to simplify the detection operation.

<Control Method>

The user terminal reports to the radio base station (network) that the user terminal supports Rel. 13 CA (for example, CA using six or more CCs). The radio base station configures CA in the user terminal by higher layer signaling (for example, RRC signaling and/or the like). Further, the radio base station reports information about the CCs to be in CA to the user terminal (information about the frequency, the number of CCs and so on).

Further, the radio base station reports information about a UCI transmission method that is applicable in Rel. 13 and later versions (for example, a new format), to the user terminal. Further, the radio base station can report information about the PUCCH resource to use when employing a PUCCH format of existing systems and/or the CC that transmits this PUCCH, to the user terminal. The PUCCH format of existing systems refers to PUCCH format 3 or PUCCH format 1b with channel selection.

In each subframe, the user terminal controls the feedback of uplink control signals (for example, HARQ-ACKs) by applying a predetermined format based on CCs in the active state.

For example, if all SCells are in the non-active state (de-activated), the user terminal can transmit uplink control signals by applying using PUCCH format 1b.

When PUCCH format 1b with channel selection is configured and the PCell and one SCell are in the active state (two CCs in total), the user terminal can apply PUCCH format 1b with channel selection.

When PUCCH format 3 is configured the PCell and one to four SCells (up to five CCs in total) are in the active state, the user terminal can apply PUCCH format 3.

If the number of CCs in the active state is six or more, the user terminal can apply a UCI transmission method stipulated in Rel. 13 and later versions (for example, a new large-capacity PUCCH format), and transmit uplink control signals.

(Variation)

Further, in this embodiment, it is also possible to apply a combination of the second example and the third example described above as appropriate. In this case, the user terminal determines the UCI transmission method (PUCCH format) to apply based on CCs in the active state and CCs where DL transmission is assigned.

For example, if the number of CCs in the active state is five or less, UCI transmission methods of Rel. 12 and earlier versions (for example, existing PUCCH formats) can be applied, instead of applying a UCI transmission method stipulated in Rel. 13 and later versions (for example, a new format). Also, if the number of CCs in the active state is six or more and the number of CCs where DL is allocated is five or less, the UCI transmission method of Rel. 12 and earlier versions (for example, existing PUCCH formats) can be applied. Furthermore, if the number of CCs in the active state is six or more and the number of CCs where DL is allocated is also six or more, a UCI transmission method stipulated in Rel. 13 and later versions (for example, a new format) can be applied. Incidentally, the number of CCs which the user terminal uses determine the switching of the format is not limited to this.

Thus, by selecting formats based on CCs in the active state and based on CCs where DL transmission is assigned, it is possible to perform uplink transmission by using formats that are suitable to the situation of commination. By this means, it is possible to reduce the UL overhead effectively.

(Structure of Radio Communication System)

Now, the structure of the radio communication system according to an embodiment of the present invention will be described below. In this radio communication system, the radio communication methods according to the embodiment of the present invention are employed. Note that the radio communication methods of the above-described embodiment may be applied individually or may be applied in combination.

Figure 9:
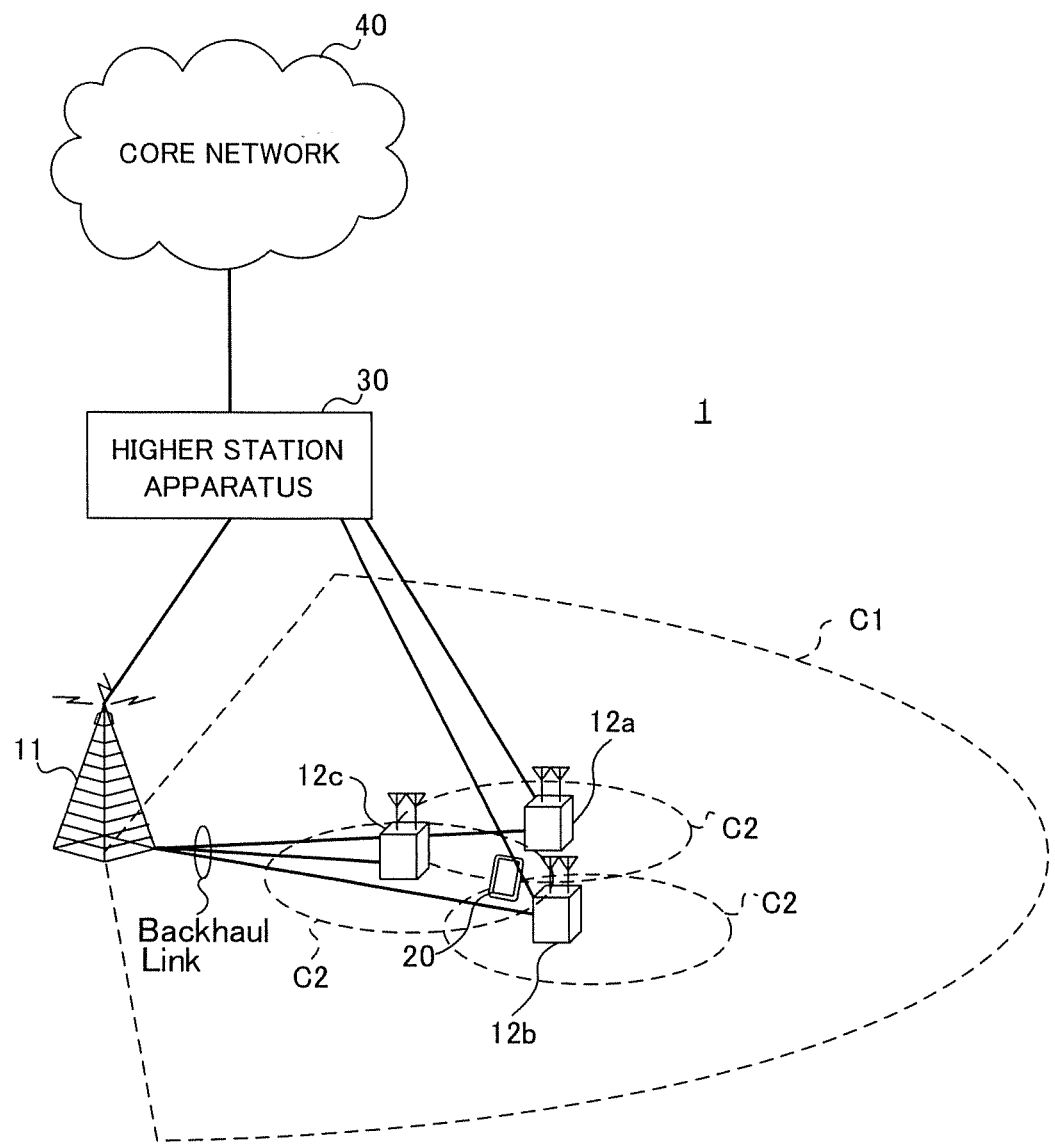
FIG. 9 is a diagram to show an example of a schematic structure of a radio communication system according to the present embodiment.

FIG. 9 is a diagram to show an example of a schematic structure of a radio communication system according to an embodiment of the present invention. Note that the radio communication system shown in FIG. 9 is a system to incorporate, for example, an LTE system, super 3G, an LTE-A system and so on. This radio communication system can adopt carrier aggregation (CA) to group a plurality of fundamental frequency blocks (component carriers) into one, where the LTE system bandwidth constitutes one unit, and/or adopt dual connectivity (DC). Note that this radio communication system may be referred to as "IMT-Advanced," or may be referred to as "4G," "5G," "FRA" (Future Radio Access) and so on.

The radio communication system 1 shown in FIG. 9 includes a radio base station 11 that forms a macro cell Cl, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using at least six or more CCs (cells).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Block) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals (HARQ-ACK) and so on are communicated by the PUCCH. By means of the PRACH, random access preambles (RA preambles) for establishing connections with cells are communicated.

<Radio Base Station>

Figure 10:
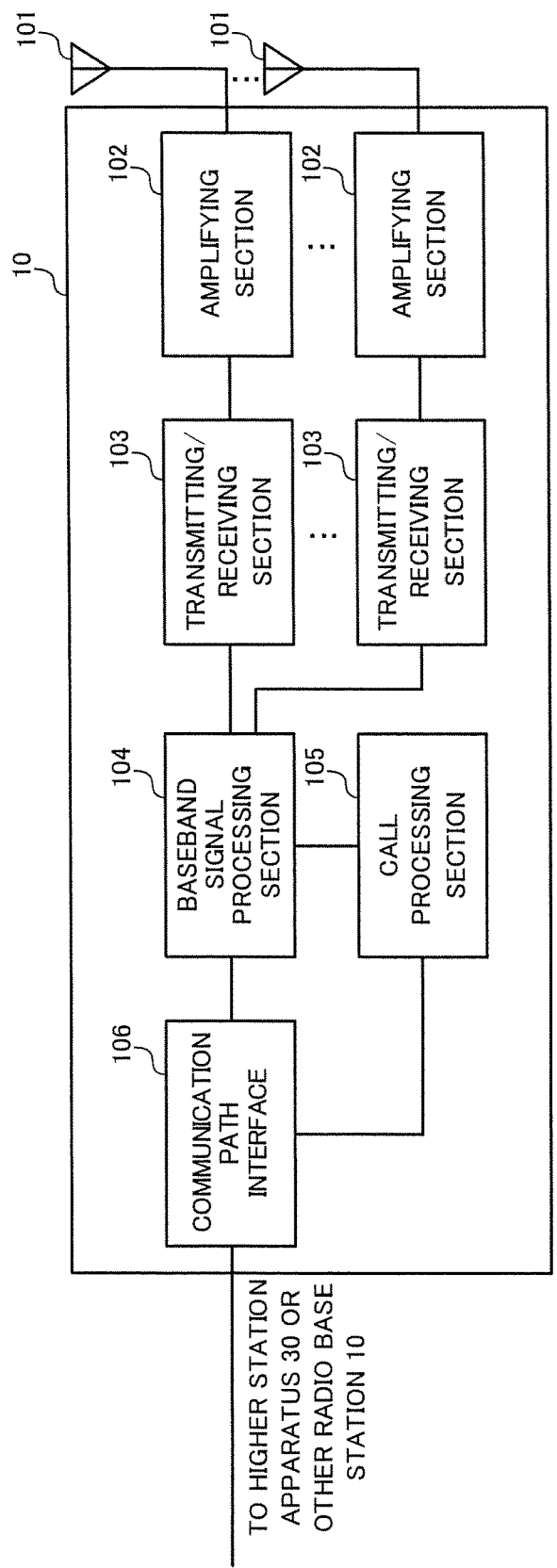
FIG. 10 is a diagram to show an example of an overall structure of a radio base station according to the present embodiment.

FIG. 10 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

For example, transmitting/receiving section 103 can transmit information about the CCs to be in CA (information about the frequency, the number of CCs and so on). In addition, the transmitting/receiving section 103 can transmit information about a UCI transmission method employed in Rel. 13 and later versions (for example, a new format), information about the PUCCH resource to use when a PUCCH format of existing systems is applied, and/or information about the CC that transmits this PUCCH. Note that, for the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. The communication path interface 106 transmits and receive s signals to and from neighboring radio base stations 10 (backhaul signaling) via an inter-base station interface (for example, optical fiber, the X2 interface, etc.).

Figure 11:
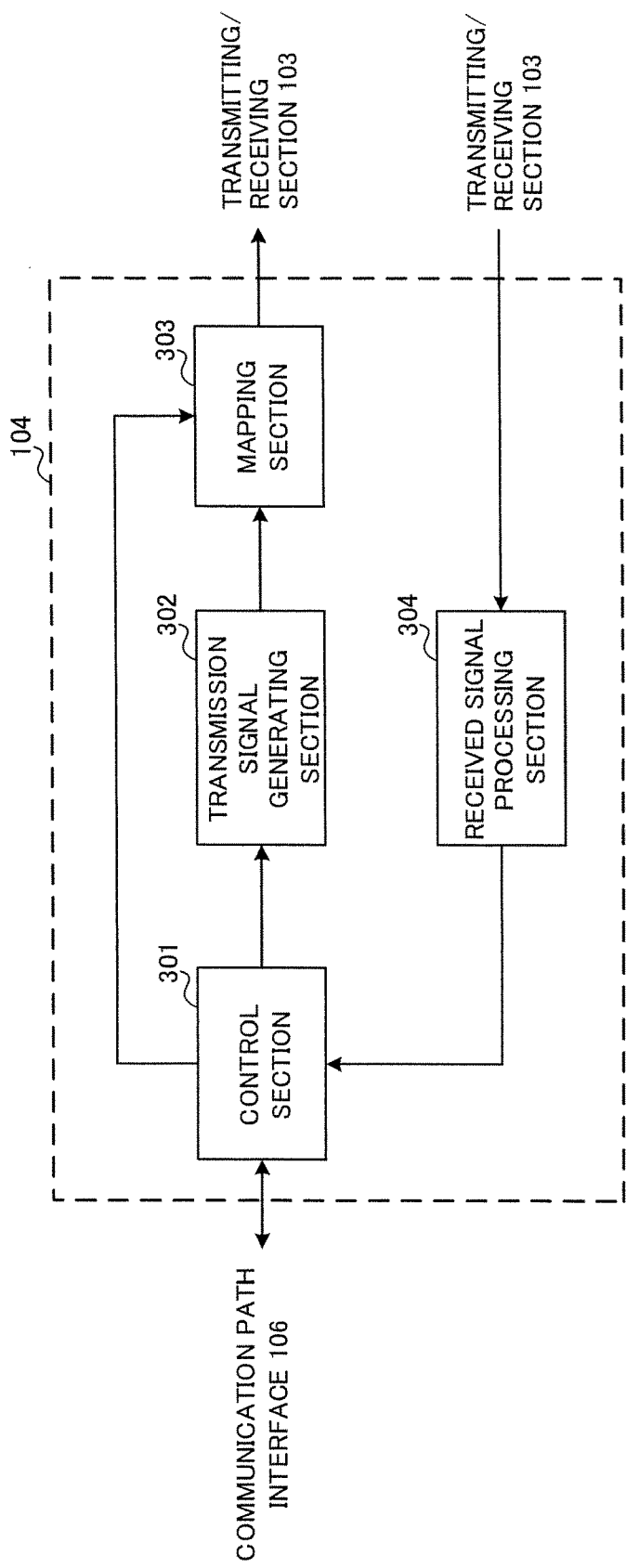
FIG. 11 is a diagram to show an example of a functional structure of a radio base station according to the present embodiment.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 has a control section (scheduler) 301, a transmission signal generating section (generation section) 302, a mapping section 303 and a received signal processing section 304.

The control section (scheduler) 301 controls the scheduling (for example, resource allocation) of downlink data signals that are transmitted in the PDSCH and downlink control signals that are communicated in the PDCCH and/or the EPDCCH. Also, the control section 301 controls the scheduling of system information, synchronization signals, paging information, CRSs (Cell-specific Reference Signals), CSI-RSs (Channel State Information Reference Signals) and so on. Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on.

The control section 301 controls the retransmission of downlink data based on delivery acknowledgment signals (HARQ-ACK) fed back from the user terminals. Further, when a user terminal determines the format to apply to uplink control information based on CCs in the active state, the control section 301 can exert control so that only radio resources that correspond to a specific PUCCH format are detected (above second example).

For the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are selected based on channel state information (CSI) from each user terminal 20 and so on.

For the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminals (for example, delivery acknowledgement signals (HARQ-ACKs), data signals that are transmitted in the PUSCH, random access preambles that are transmitted in the PRACH, and so on). The processing results are output to the control section 301.

When a user terminal determines the format to apply to uplink control information based on CCs in the active state, the received signal processing section 304 can perform the detection operation only for radio resources that correspond to a specific PUCCH format, according to a command from the control section 301 (above second example).

Also, by using the received signals, the received signal processing section 304 may measure the received power (for example, the RSRP (Reference Signal Received Power)), the received quality (for example, the RSRQ (Reference Signal Received Quality)), channel states and so on. The measurement results may be output to the control section 301.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 12:
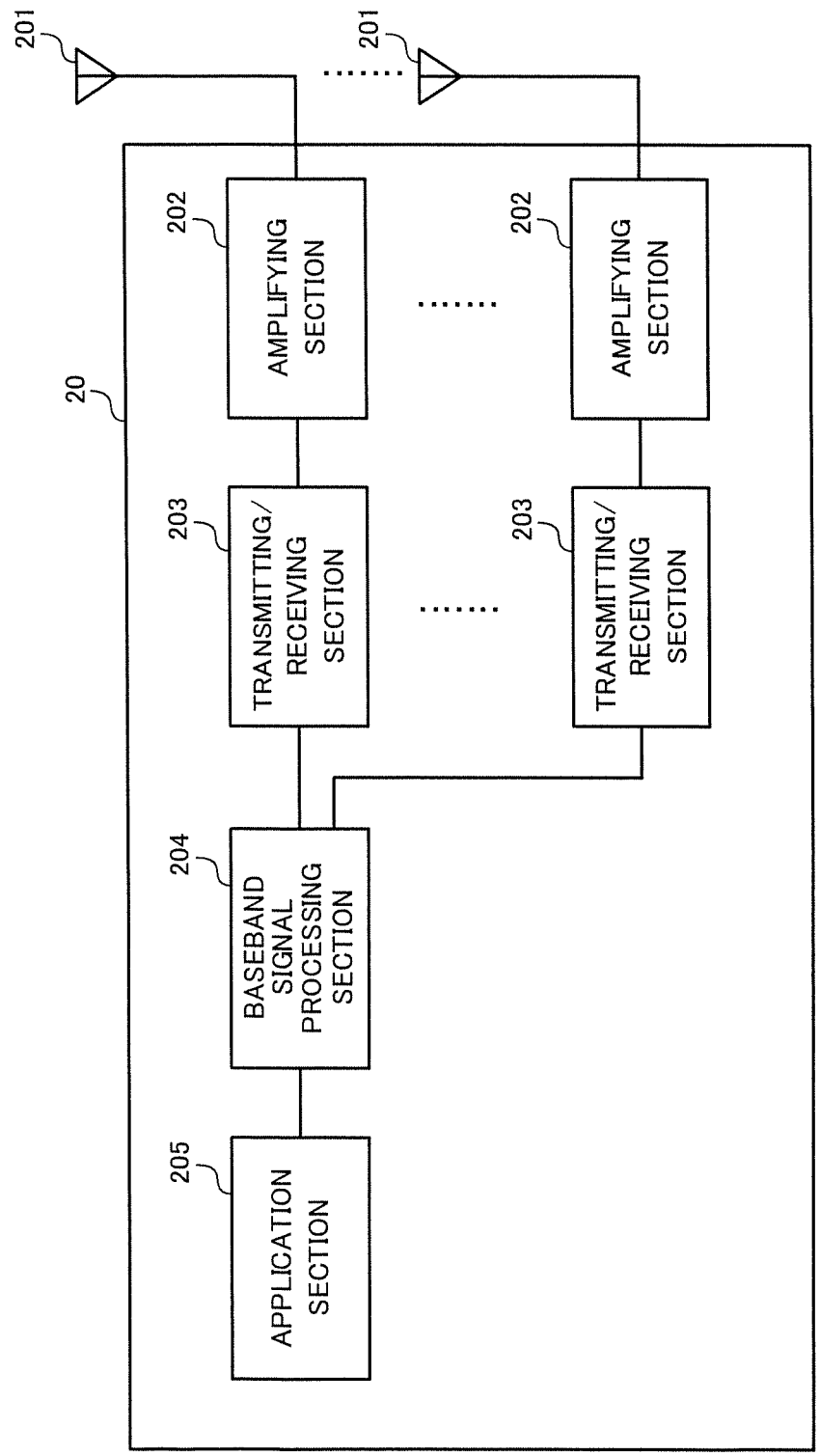
FIG. 12 is a diagram to show an example of an overall structure of a user terminal according to the present embodiment.

FIG. 12 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving sections 203 transmit UL control signals (PUCCH), including delivery acknowledgement signals in response to DL signals (for example, the PDSCH). Further, transmitting/receiving section 203 may receive information about the resources to which UL control signals to transmit by using existing PUCCH formats are allocated, and/or information about the CCs that transmit the UL control signals. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 13:
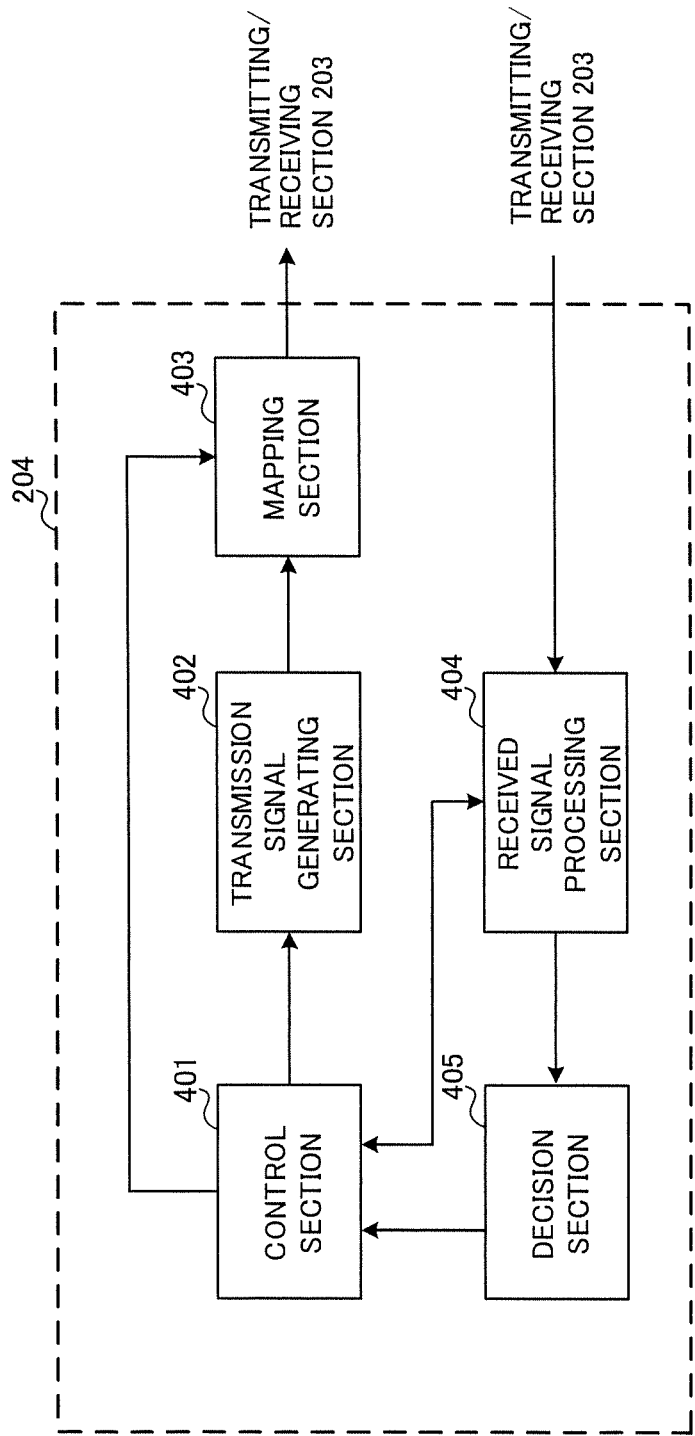
FIG. 13 is a diagram to show an example of a functional structure of a user terminal according to the present embodiment.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generating section 402, a mapping section 403, a received signal processing section 404 and a decision section 405.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. To be more specific, the control section 401 can control the transmission signal generating section 402, the mapping section 403 and the received signal processing section 404.

For example, the control section 401 controls the format to apply to the transmission of UL control signals (for example, HARQ-ACKs). Further, the control section 401 can apply a new format, having large capacity in comparison to the PUCCH formats of existing systems in which the number of CCs that can be configured is five or less, to UL control signals.

Further, the control section 401 can change the format to apply to UL control signals based on the number of CCs where DL signals are allocated. For example, if the number of predetermined CCs where DL signals are allocated is five or less, the control section 401 can apply PUCCH format 3 of existing systems to UL control signals. Further, if the number of predetermined CCs where DL signals are allocated is two or less, the control section 401 can apply PUCCH format 1b with channel selection of existing systems to UL control signals. Further, the control section 401, if DL signals are allocated to the PCell alone, PUCCH format 1b of existing systems can be applied to UL control signals.

Further, the control section 401 can switch among and apply PUCCH format 1b with channel selection, PUCCH format 3 and a new format to UL control signals based on the number of CCs in the active state.

For the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401 and the decision section 405. The received signal processing section 404 outputs, for example, broadcast information, system information, RRC signaling, DCI and so on, to the control section 401.

The received signal processing section 404 can be constituted by a signal processor, a signal processing circuit or a signal processing device, and a measurer, a measurement circuit or a measurement device that can be described based on common understanding of the technical field to which the present invention pertains. Also, the received signal processing section 404 can constitute the receiving section according to the present invention.

The decision section 405 makes retransmission control decisions (ACKs/NACKs) based on the decoding results in the receiving process section 404, and, furthermore, outputs the results to the control section 401. When downlink signals (PDSCH) are transmitted from multiple CCs (for example, six or more CCs), retransmission control decisions (ACKs/NACKs) are made on a per CC basis, and output to the control section 401. For the decision section 405, a decision maker, a decision making circuit or a decision making device that can be described based on common understanding of the technical field to which the present invention pertains can be used.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as an ASIC (Application-Specific Integrated Circuit), a PLD (Programmable Logic Device), an FPGA (Field Programmable Gate Array), and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-014909, filed on Jan. 29, 2015, including the specification, drawings and abstract, is incorporated herein by reference in its entirety.

The invention claimed is:

1. A user terminal comprising:
   a receiver that receives a downlink (DL) signal;
   a transmitter that transmits uplink (UL) control information which includes a delivery acknowledgement signal in response to the DL signal; and
   a processor that controls a format to apply to transmission of the UL control information,
   wherein the processor supports a new choice of format having a large number of bits in comparison to a Physical Uplink Control Channel (PUCCH) format of an existing system (Rel. 10-12) and changes the format to apply to the transmission of the UL control information based on a number of cells to which the DL signal is allocated.

2. A radio base station comprising:
   a transmitter that transmits a downlink (DL) signal;
   a receiver that receives uplink (UL) control information which includes a delivery acknowledgement signal in response to the DL signal; and
   a processor that controls a format which a user terminal applies to the UL control information,
   wherein the processor configures the use terminal with a new choice of format having a large number of bits in comparison to a Physical Uplink Control Channel PUCCH format of an existing system (Rel. 10-12), and the receiver receives UL control information to which a given choice of format is applied based on a number of cells allocated with the DL signal.

3. A radio communication method for a user terminal, comprising:
   receiving a downlink (DL) signal;
   generating a uplink (UL) control information which includes a delivery acknowledgement signal in response to the DL signal; and
   controlling a format to apply to transmission of the UL control information,
   wherein the user terminal supports a new choice of format having a large number of bits in comparison to a Physical Uplink Control Channel (PUCCH) format of an existing system (Rel. 10-12) and changes the format to apply to the transmission of the UL control information based on a number of cells to which the DL signal is allocated.

4. The user terminal according to claim 1, wherein when the new choice of format is configured by higher layer signaling, the processor determines the number of cells to which the DL signal is allocated, based on detection of a downlink control channel, and selects the new choice of format to apply to the transmission of the UL control information.

5. The user terminal according to claim 1, wherein the new choice of format applied by the processor has a smaller orthogonal code length than a PUCCH format 3.

6. The user terminal according to claim 1, wherein the new choice of format applied by the processor uses a plurality of Physical Resource Blocks (PRBs).

7. The user terminal according to claim 1, wherein when the cells to which the DL signal is allocated comprise only a primary cell, the processor applies the PUCCH format 1b of the existing system (Rel. 10-12) to the UL control information.

8. The user terminal according to claim 1, wherein the user terminal is capable of communication using six or more cells.

9. The user terminal according to claim 4, wherein the new choice of format applied by the processor has a smaller orthogonal code length than a PUCCH format 3.

10. The user terminal according to claim 4, wherein the new choice of format applied by the processor uses a plurality of Physical Resource Blocks (PRBs).

11. The user terminal according to claim 5, wherein the new choice of format applied by the processor uses a plurality of Physical Resource Blocks (PRBs).

12. The user terminal according to claim 4, wherein when the cells to which the DL signal is allocated comprise only a primary cell, the processor applies the PUCCH format 1b of the existing system (Rel. 10-12) to the UL control information.

13. The user terminal according to claim 5, wherein when the cells to which the DL signal is allocated comprise only a primary cell, the processor applies the PUCCH format 1b of the existing system (Rel. 10-12) to the UL control information.

14. The user terminal according to claim 6, wherein when the cells to which the DL signal is allocated comprise only a primary cell, the processor applies the PUCCH format 1b of the existing system (Rel. 10-12) to the UL control information.

15. The user terminal according to claim 4, wherein the user terminal is capable of communication using six or more cells.

16. The user terminal according to claim 5, wherein the user terminal is capable of communication using six or more cells.

17. The user terminal according to claim 6, wherein the user terminal is capable of communication using six or more cells.

18. The user terminal according to claim 7, wherein the user terminal is capable of communication using six or more cells.

* * * * *